Oct. 24, 1961     E. C. SOARES     3,005,932
PROTECTIVE CIRCUITS
Filed July 3, 1958
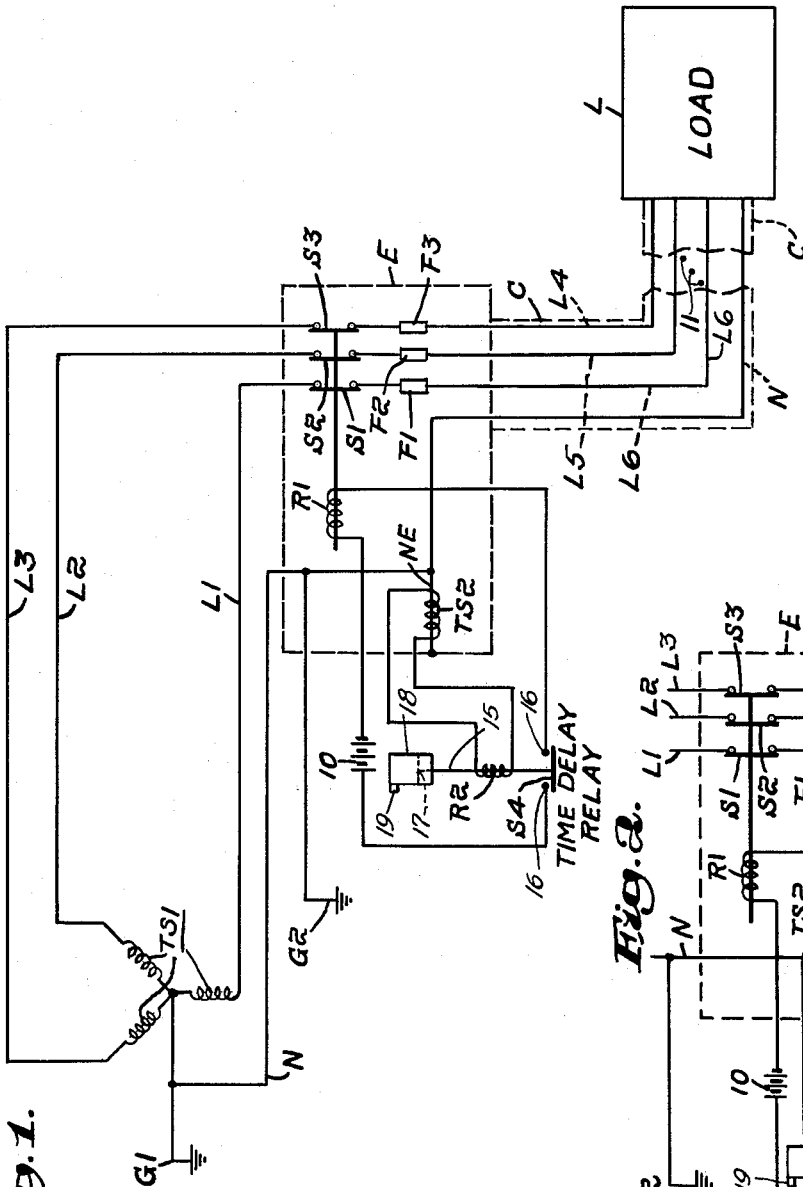
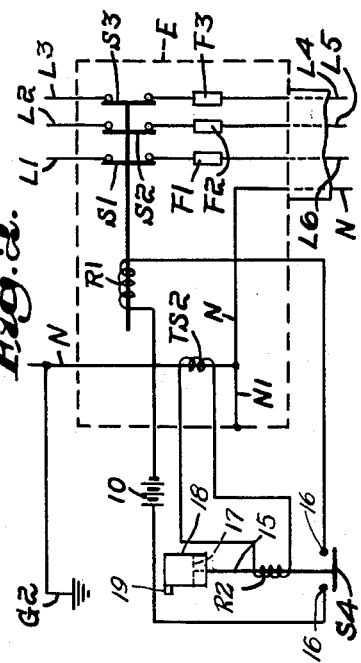
Inventor:
Eustace C. Soares,
by Robert T. Palmer
Attorney

United States Patent Office 3,005,932
Patented Oct. 24, 1961

3,005,932
PROTECTIVE CIRCUITS
Eustace C. Soares, Tenafly, N.J.
(Room 1010, 75 West St., New York 6, N.Y.)
Filed July 3, 1958, Ser. No. 746,361
6 Claims. (Cl. 317—18)

This invention relates to alternating current protective circuits.

In alternating current systems having grounded conductors, it is usual to include protective devices which will open the supply circuits when there are large predetermined currents such as may be caused by short-circuits or overloads. Many ground faults occur in such systems resulting in fault currents which are insufficient to operate the usual over-current protective devices, resulting often in fires, and in loss of life and property.

An object of this invention is to open an alternating current supply circuit when a relatively low fault current occurs.

In three-phase supply systems having each phase individually protected as by a fuse, a fuse in one phase may blow, leaving the other two phases alive.

Another object of this invention is to open a three-phase supply circuit when an abnormal current occurs in only one of the three phases.

This invention will now be described with reference to the annexed drawings, of which:

FIG. 1 is a circuit schematic of one embodiment of this invention, and

FIG. 2 is a modification of a portion of the circuit of FIG. 1.

Referring first to FIG. 1, a conventional three-phase supply source such as the secondary TS1 of a power transformer, has a neutral N grounded at G1 at the transformer, and at G2 at the supply side of a metal, service equipment enclosure E, as is required by the National Electrical Code. The enclosure E contains switches S1, S2 and S3, connected in series with conductors L1, L2 and L3 respectively, of the secondary TS1, and contains fuses F1, F2 and F3 connected in series with the switches S1, S2 and S3 respectively, and conductors L4, L5 and L6 respectively, connected to a load L. The enclosure E also contains a relay R1 for opening the switches S1, S2 and S3.

The neutral N extends within the enclosure E, and has a neutral extension NE which grounds the neutral to the enclosure E, and which serves as a single turn, primary winding of a voltage step-up (current step-down) transformer having a secondary winding TS2. The winding TS2 is connected in series with the energizing winding of time-delay relay R2. The relay R2 has a plunger 15 attached at one end to switch S4 which bridges contacts 16 when the relay R2 is energized, which contacts are connected in series with battery 10 and the energizing winding of the relay R1. The other end of the plunger 15 is connected to piston 17 in an air cylinder 18 having an air vent 19. When the relay R2 is energized by current from the secondary TS2 of the current transformer, it energizes the relay R1 which then opens the protective switches S1, S2 and S3.

The protective circuit of this invention is particularly suited for use in circuits having current carrying capacities of from 1,200 amperes to 4,000 amperes. The relay R2 may be a conventional one having an energizing winding energized at a current of about five amperes, and the secondary TS2 of the current transformer would have a turns ratio to provide the proper energizing current for the relay R2. The current transformer would be of a conventional dough-nut or slip-over type.

The conductors L4, L5 and L6, and the neutral N extend from the enclosure E to the load L through a metal conduit C grounded to the enclosure E and to the load as is required by the code.

In the operation of FIG. 1, a high impedance ground represented schematically as a corona discharge 11 may develop between the conductor L6 and the conduit C, the impedance of the fault being too high to produce a current sufficient to cause the fuse F1 to blow. A closed circuit is established, however, through the conductor L6, conduit C, enclosure E, the neutral extension NE, neutral N, the transformer secondary TS1, conductor L1, switch S1 back to conductor L6 and fuse F1. The fault current flowing through this circuit causes the current induced in the secondary winding of the current transformer to energize the relay R2 which closes the switch S4, and energizes the relay R1 which opens the protective switches S1, S2 and S3.

The compression of the air by the piston 17 in the air cylinder 18 of the time-delay R2 delays the closing of the switch S4 to give additional time for the fuses to blow, or the usual circuit breaker if used instead of the fuses, to open, in case the fault current is sufficient to operate the usual over-current device, although since both relays have to operate in succession to operate the protective circuit of this invention, the usual over-current protective device should operate first. The additional time delay is preferred as providing a factor of safety. Thus, the protective circuit of this invention operates only when the fault current is insufficient to operate the usual over-current protective device.

FIG. 2 shows a modification of the circuit of FIG. 1 in which protection is automatically provided when a single phase fault current is sufficient to blow a fuse in that single phase circuit. In FIG. 2, the current transformer secondary TS2 instead of extending around the neutral extension NE connected to the enclosure E, extends instead, around the neutral N. The circuit of FIG. 2 will operate as does the circuit of FIG. 1 on a high impedance fault current since the current transformer in both circuits responds to current flowing from the enclosure E through the neutral. The circuit of FIG. 2 will also open the protective switches S1, S2 and S3 if single phase fault conditions develop from any cause.

If a single phase fault current is sufficient to blow a fuse in that single phase circuit, the other two phases will be alive, and the system will be unbalanced so that current flow through the neutral N will cause the relays R2 and R1 to be energized and to open the protective switches S1, S2 and S3. With reference to FIG. 2, suppose that the fault 11 has such a low impedance that the fuse F3 blows. The relay R2 would be energized due to the unbalance current in the neutral, and the relay R1 would be energized to open the protective switches S1, S2 and S3, deenergizing the other two phases.

What is claimed is:

1. In a protective circuit for an A.C. supply source having a metallic equipment enclosure between said source and a load energized by said source, having first conductor means extending from said source into said enclosure, having over-current protective means within said enclosure, having second conductor means extending from within said enclosure to said load, having a grounded conductor extending from said source through said enclosure to said load, and having metallic conduit means around said second conductor means and said grounded conductor where it extends between said enclosure and said load, said conduit means being grounded to said load and to said enclosure, the improvement comprising a first relay having an energizing winding and having normally closed switching means within said enclosure, a circuit connecting said switching means, said over-current protective means and said first and second conductor means in series, said protective means opening said last mentioned circuit when relatively large fault current flows in said last mentioned circuit, means within said enclosure grounding said grounded conductor to said enclosure, a second relay having an energizing winding and having a switch within said enclosure, means responsive to relatively small fault current too small to operate said protective means flowing from a high impedance fault through said conduit means, said enclosure, said grounding means and said grounded conductor, in series, to said source, connected to said winding of said second relay for energizing said second relay, and means including said switch of said second relay connected to said winding of said first relay for energizing said first relay.

2. The invention claimed in claim 1 in which the means grounding said grounded conductor to said enclosure is an extension conductor connected to said grounded conductor and to said enclosure, and in which said means responsive to current comprises a transformer secondary winding around said extension conductor.

3. The invention claimed in claim 1 in which means is provided for delaying the switch actuating action of one of said relays for providing additional time for said protective means to open said last mentioned circuit before said first relay can open said normally closed switching means when relatively large fault current flows in said last mentioned circuit.

4. In a protective circuit for a three-phase supply source having a metallic equipment enclosure between said source and a load energized by said source, having over-current protective means for each phase of said source within said enclosure, having first conductors for each phase of said source extending from said source into said enclosure, having second conductors for each phase of said source extending from within said enclosure to said load, having a grounded neutral extending from said source through said enclosure to said load, and having metallic conduit means around said second conductors and around said neutral where it extends between said enclosure and said load, said conduit means being grounded to said enclosure and to said load, the improvement comprising a first relay having normally closed switches for each phase of said source within said enclosure, a circuit connecting said switches, said over-current protective means, and said first and second conductors in series, said protective means opening said last mentioned circuit when relatively large fault current flows in said last mentioned circuit, means within said enclosure grounding said neutral to said enclosure, a second relay having a switch within said enclosure, said first and second relays having energizing windings within said enclosure, means responsive to relatively small fault current too small to operate said protective means flowing from a high impedance fault through said conduit means, said enclosure, said grounding means and said neutral, in series, to said source connected to said winding of said second relay for energizing said second relay, and means including said switch of said second relay connected to said winding of said first relay for energizing said first relay.

5. The invention claimed in claim 4 in which the means grounding said neutral to said enclosure is an extension conductor connected to said neutral and to said enclosure, and in which said means responsive to current comprises a transformer secondary winding around said extension conductor.

6. The invention claimed in claim 4 in which means is provided for delaying the switch actuating action of one of said relays for providing additional time for said protective means to open said last mentioned circuit before said first relay can open said normally closed switching means when relatively large fault current flows in said last mentioned circuit.

References Cited in the file of this patent

UNITED STATES PATENTS

| | | |
|---|---|---|
| 1,308,059 | Fortescue | July 1, 1919 |
| 1,734,874 | Norberg | Nov. 5, 1929 |
| 2,272,991 | Hanna | Feb. 10, 1942 |
| 2,309,433 | Anderson | Jan. 26, 1943 |
| 2,535,064 | Harrison | Dec. 26, 1950 |
| 2,542,838 | Reagan | Feb. 20, 1951 |
| 2,895,104 | Hansen | July 14, 1959 |
| 2,920,241 | Jacobs | Jan. 5, 1960 |

FOREIGN PATENTS

| | | |
|---|---|---|
| 427,183 | Great Britain | Apr. 17, 1935 |
| 800,605 | Great Britain | Aug. 27, 1958 |